May 31, 1949.  L. N. ELKIN  2,471,420
COLLAPSIBLE STEAM TABLE
Filed May 24, 1945  3 Sheets-Sheet 1
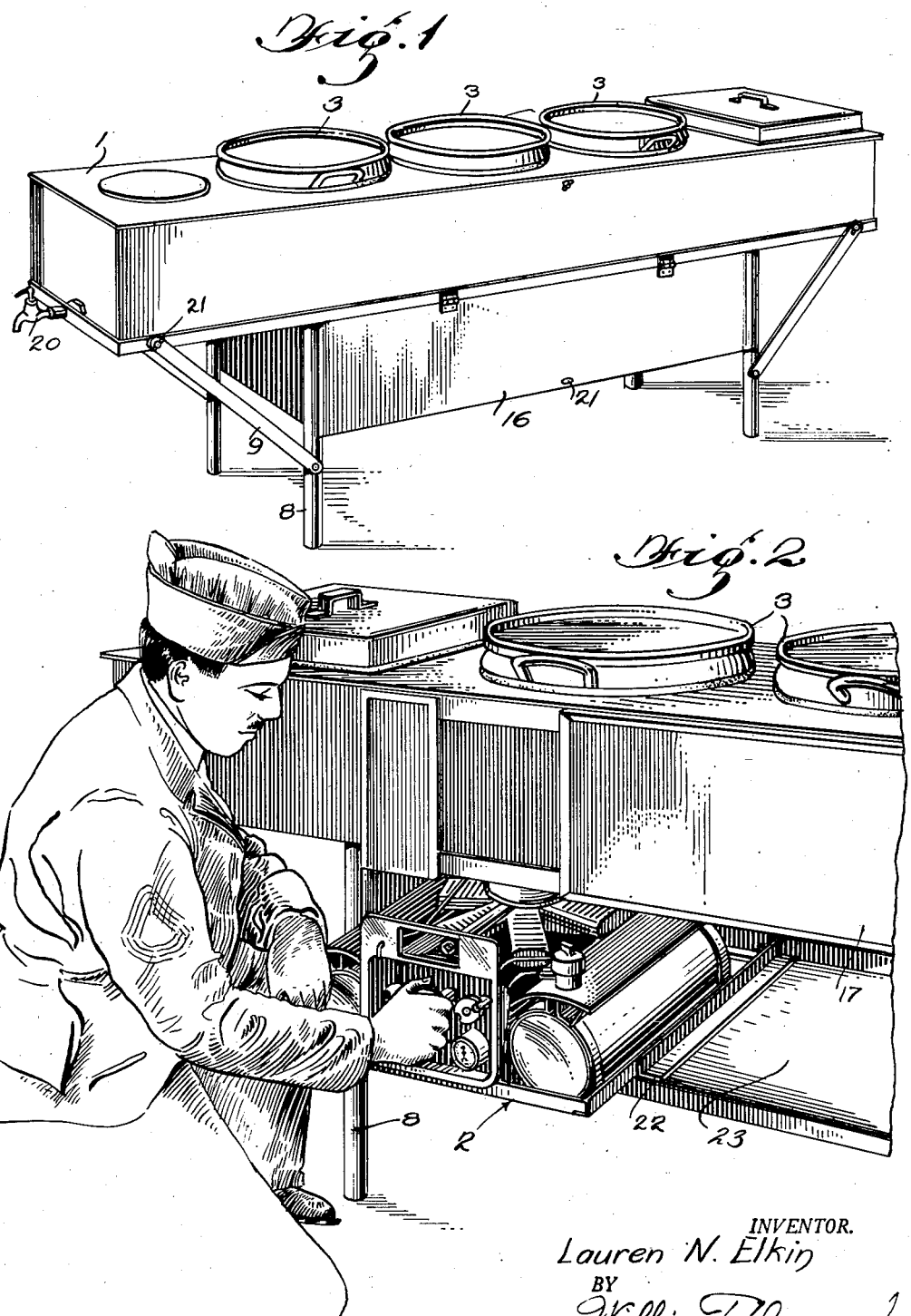
INVENTOR.
Lauren N. Elkin
BY
William F. Desmond
ATTORNEY May 31, 1949. L. N. ELKIN 2,471,420
COLLAPSIBLE STEAM TABLE
Filed May 24, 1945 3 Sheets-Sheet 2
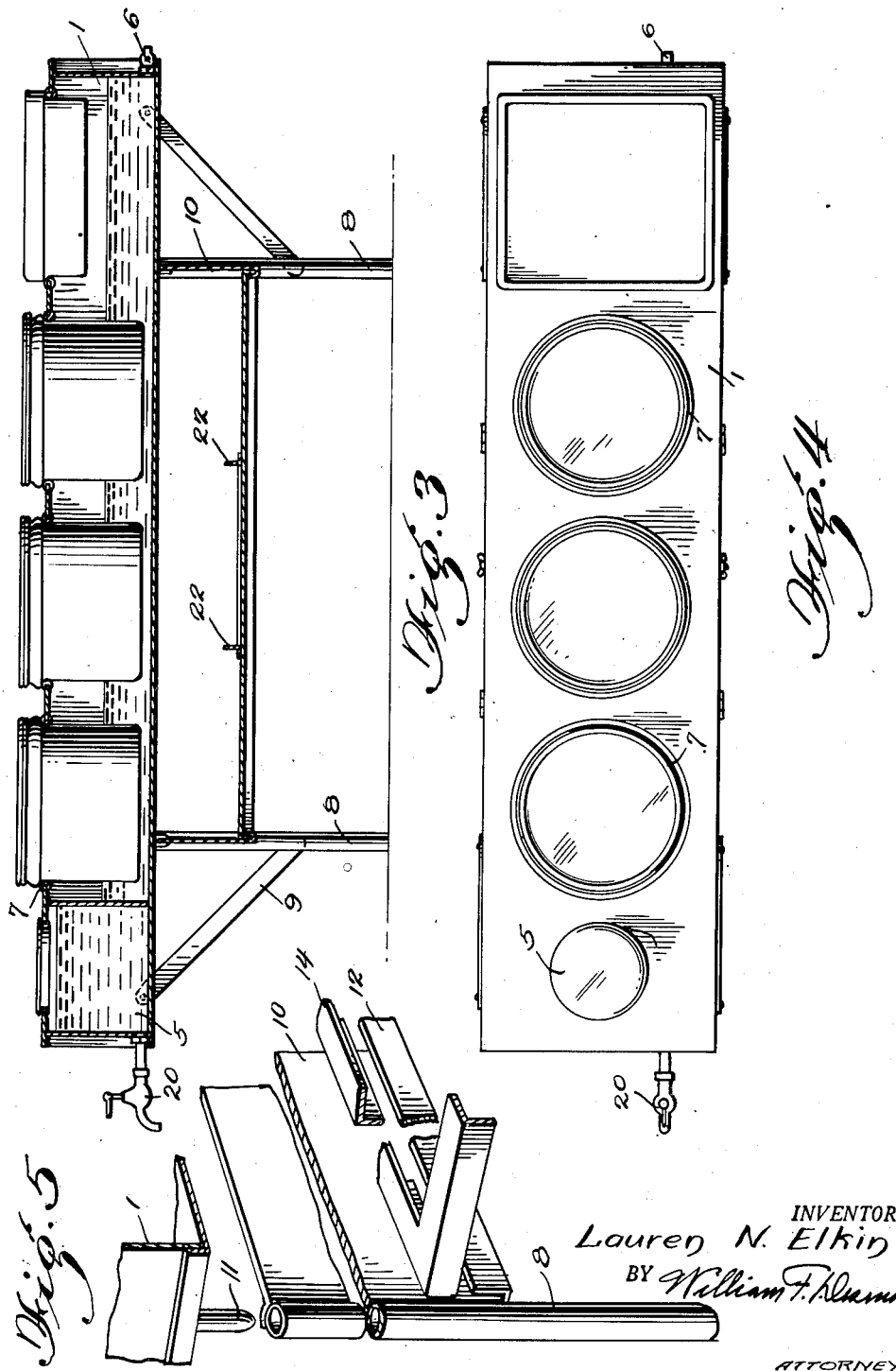
INVENTOR.
Lauren N. Elkin
BY
ATTORNEY

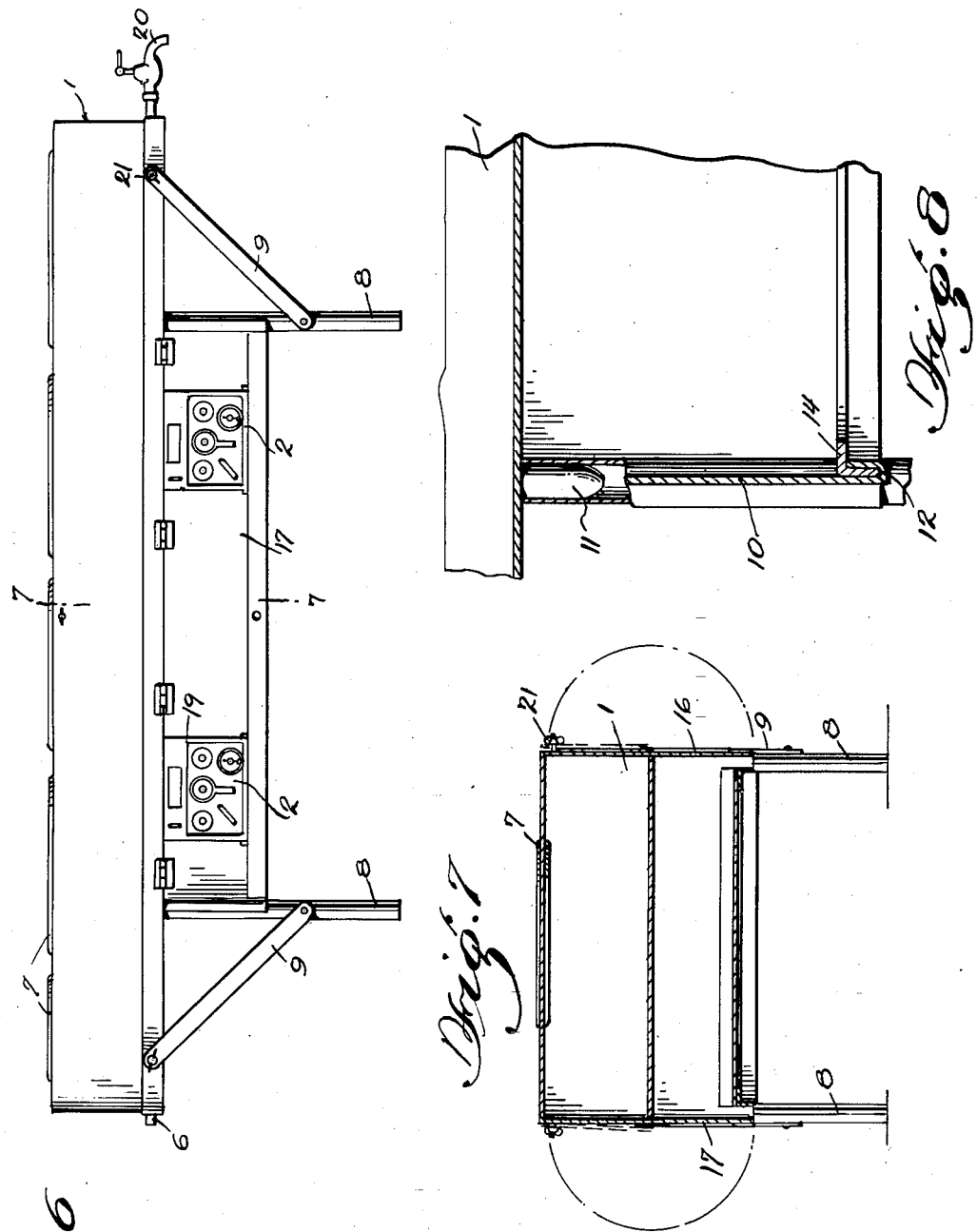

Patented May 31, 1949

2,471,420

UNITED STATES PATENT OFFICE 2,471,420

COLLAPSIBLE STEAM TABLE

Lauren N. Elkin, United States Army,
Oakland, Calif.

Application May 24, 1945, Serial No. 595,621

6 Claims. (Cl. 126—33)

(Granted under the act of March 3, 1883, as
amended April 30, 1928; 370 O. G. 757)

The invention described herein, if patented may be manufactured and used by or for the Government for governmental purposes, without payment to me of any royalty thereon.

This invention relates to a collapsible steam table which is convenient for serving under semi-field conditions.

A specific object of my invention is to provide a readily domountable and portable collapsible steam table for use in base camps, field armies, or in more or less permanent kitchen installations for field use whether in the Army, in construction camps or in other locations where it is desirable to have the convenience and versatility of a modern steam table combined with light weight and movability.

It is an object of my invention to provide a steam table which will permit food service and efficiency comparable to service in commercial cafeterias, and, yet, maintain the portability desired for movable installations.

A further object of my invention is to provide a steam table to assist in eliminating overcooked and tasteless foods, prevent the loss of vitamins, and, yet permit foods to be served over a long period of time with the freshness of newly cooked foods.

Another object of my invention is to provide a steam table which will hold standard sized cooking vessels, be light, versatile and easily cleaned, and on which the legs and fire box may be collapsed to provide ready portability.

It is also an object of this invention to provide a collapsible steam table of generally improved construction which will be simple, durable, and inexpensive in construction, as well as convenient, practicable, serviceable and efficient in use.

With the foregoing and other objects in view which will appear, as the description proceeds, the invention resides in the combination and arrangement of parts and in the details of construction herein described and claimed; it being understood that various changes in form, proportion and details of construction may be made within the scope of the claims without departing from the spirit or sacrificing any of the advantages of the invention. For a complete disclosure of the invention a detailed description thereof will now be given in connection with the drawings forming a part of the specification wherein:

Figure 1 is a view of the assembled steam table.

Figure 2 is a view of the table with the front of the fire unit partially removed for starting.

Figure 3 is a sectional view of the steam table assembled for use but with the fire unit removed.

Figure 4 is a top view of the assembled steam table.

Figure 5 is an exploded view showing the details of one method of assembling the steam chest to the legs and the fire box frame to the leg-connector member.

Figure 6 is a front view of the stove set up and assembled for use before placing the pots therein.

Figure 7 is a sectional view along line 7—7 of Figure 6 showing the method of attaching the front and back members forming parts of the fire box.

Figure 8 is a partial view showing details of assembling the stubs in the legs and the frame of the leg members.

The steam table is preferably constructed of aluminum to lower the weight so that it will be more portable and may be used for airborne operations, however, galvanized iron, tinned iron, copper, brass or other reasonably non-corrosive materials of construction may be used in the construction of the table. In the drawings is shown a steam chest 1 which is provided with fire units 2 to keep the chest hot.

The steam chest as illustrated is shown provided with two standard army field stove fire units, M-1937. Other heating sources such as gas burners or other fluid fuel burners may be readily used with the steam table. For emergency operation a metal grate could be used to permit the burning of solid fuel. The chest itself is welded, soldered, bolted, or otherwise assembled from flat sheet metal, and is provided with apertures for the reception of food-containing vessels. In the stove as illustrated there are provided openings for three standard ten-gallon army cook pots and a standard army roasting pan, to permit greater versatility and utilization of army issue equipment. The cook pots, roasting pan are standard items of army issue and compile no part in the present invention. A coffee pot 5 is provided at one end of the steam chest as a built-in kettle provided with a spigot 20 at its lower portions to permit the serving of hot coffee without the use of supplementary equipment. This may be provided as shown by partitioning off one end of the chest, the partition wall providing adequate heat transfer to keep the coffee properly heated.

A drain plug 6 is provided at one end to drain the table as required. Grommets 7 of rubber or fiber encircle each of the apertures in the upper surface to assist in preventing the loss of steam. The table is shown with tubular legs 8, the lower ends of which may be provided with casters or bearing feet, the legs are connected by braces 9 to the steam chest, to which the braces are secured with thumb screws 21. Legs are fastened together in pairs by sheet members 10 which insure rigidity of leg construction, and provide the ends for the fire box, and which are bent up at the lower edge, to provide grooves 12 in which the support frame angles fit. The legs have detachably interlocking adapters provided for fastening to the steam chest. As shown in Figure 5 these may consist of short stubs or studs 11 at the locations which fit into the tubular leg members, however, other detachable linkages may be used at this point, it frequently being convenient to provide sockets built into the bottom of the steam chest in which projections on the legs may fit and lock in order that there will be no parts of the steam chest extending below the flat bottom surface thereof. The fire units are supported by a frame of angle members 14 which assemble into the grooves 12 to provide support for the frame and lock the leg members in place. The steam table may be provided with one or more burner units which are positioned by spacers 22 so as to be held in place by the sheet members 10. Between the braces is shown an inner burner bottom 23 for the combustion chamber to prevent loss of heat. In the rear of the combustion chamber is provided a shield 16 which is hinged from the steam chest proper and held thereto by thumb screws 21 as illustrated by dotted lines in Figure 7 when the table is collapsed. When assembled the shield 16 drops and is held in position by thumb screws 21. In front is provided a similar shield 17 which is provided with two apertures 19 for access to the fire unit heat controls.

The front shield may be raised and the fire unit members pulled out as illustrated in Figure 2 for filling with fuel or starting the fire. The spacers insure that the burner unit will be properly positioned when pushed back into a firing position. If the burner adjusting apertures 19 in the front shield do not provide sufficient opportunity for the escape of the burning gases, holes may be cut in the inter-leg sheet members 10, but the necessity therefor depends upon the particular proportions of parts selected.

It will be understood that the foregoing description of a preferred embodiment of my invention is not intended to limit its scope to the particular dimensions, location or connections, number of fire units, and other details which may be modified and varied without departing from the spirit of my invention. Such modifications and variations, which will readily occur to the expert, are deemed to fall within the scope of my appended claims.

I claim:

1. A portable knockdown steam table comprising a rectangular steam chest of sheet metal; a plurality of spaced studs at the bottom of said steam chest; detachable legs apertured to interfit with said studs; a pair of flat sheet metal members so constructed and arranged as to form the end walls of a combustion chamber when said steam table is assembled; a rectangular supporting member for a fire unit, said supporting member being adapted to form the bottom of said combustion chamber when said steam chamber is assembled; and shield means hingedly connected to opposite bottom edges of said steam chest and adapted to lie flat against said steam chest when said steam table is knocked down and to depend downwardly from said steam chest so as to form front and rear walls of said combustion chamber when said steam table is assembled, the shield means forming said front wall being so constructed and arranged as to permit access to said fire unit when said steam table is assembled.

2. A portable knockdown steam table comprising a rectangular steam chest of sheet metal; a pair of detachable ground-engaging assemblies for supporting said steam chest, each of said assemblies comprising a pair of legs and a metal sheet interconnecting said legs, said metal sheet forming an end wall of a combustion chamber when said steam table is assembled; a rectangular supporting member for a fire unit, said member being adapted to form the bottom of said combustion chamber when said steam table is assembled; releasable interconnecting means on said ground-engaging assemblies and on said supporting member; and shield means hingedly connected to opposite bottom edges of said steam chest and adapted to lie flat against said steam chest when said steam table is knocked down and to depend downwardly from said steam chest so as to form front and rear walls of said combustion chamber when said steam table is assembled, the shield means forming said front wall being so constructed and arranged as to permit access to said fire unit when said steam table is assembled.

3. A portable knockdown steam table comprising a rectangular steam chest of sheet metal; a plurality of studs spaced in pairs at the bottom of said steam chest; a pair of ground-engaging assemblies for supporting said steam chest and detachable therefrom, each of said assemblies comprising a pair of spaced legs apertured to interfit with a pair of said spaced studs and a metal sheet interconnecting said legs, said metal sheet forming an end wall of a combustion chamber when said steam table is assembled; a rectangular supporting member for a fire unit, said supporting member being adapted to form the bottom of said combustion chamber when said steam table is assembled; releasable interconnecting means on said ground-engaging assemblies and on said supporting member; and shield means hingedly connected to opposite bottom edges of said steam chest and adapted to lie flat against said steam chest when said steam table is knocked down and to depend downwardly from said steam chest so as to form front and rear walls of said combustion chamber when said steam table is assembled, the shield means forming said front wall being so constructed and arranged as to permit access to said fire unit when said steam table is assembled.

4. A portable knockdown steam table comprising a rectangular steam chest of sheet metal; a pair of ground-engaging assemblies for supporting said steam chest and detachable therefrom, each of said assemblies comprising a pair of legs and a metal sheet interconnecting said legs, said metal sheet having a bottom flange and forming an end wall of a combustion chamber when said steam table is assembled; a rectangular supporting member for a fire unit, said supporting member having a pair of flanges at opposite edges engageable with the flanges of said end walls and being adapted to form the bottom of said combustion chamber when said steam table is assembled; shield means hingedly connected to a bottom edge of said steam chest and adapted to lie flat against said steam chest when said steam table is knocked down and to depend downwardly from said steam chest so as to form a rear wall of said combustion chamber when said steam table is assembled; and shield means hingedly connected to an opposite bottom edge of said steam chest and adapted to lie flat against said steam chest when said steam table is knocked down and to depend downwardly from said steam chest so as to form a front wall of said combustion chamber when said steam table is assembled, said last-named shield means being so constructed and arranged as to permit access to said fire unit when said steam table is assembled.

5. A portable knockdown steam table comprising a rectangular steam chest of sheet metal; spaced studs at the bottom of said steam chest; a pair of ground-engaging assemblies for supporting said steam chest and detachable therefrom, each of said assemblies comprising a pair of legs and a metal sheet interconnecting said legs, said metal sheet having a bottom flange and forming an end wall of a combustion chamber when said steam table is assembled, said legs being apertured to interfit with said studs on said steam chest; a rectangular supporting member for a fire unit, said supporting member having a pair of flanges at opposite edges engageable with the flanges of said end walls and being adapted to form the bottom of said combustion chamber when said steam table is assembled; shield means hingedly connected to a bottom edge of said steam chest and adapted to lie flat against said steam chest when said steam table is knocked down and to depend downwardly from said steam chest so as to form a rear wall of said combustion chamber when said steam table is assembled; and shield means hingedly connected to an opposite bottom edge of said steam chest and adapted to lie flat against said steam chest when said steam table is knocked down and to depend downwardly from said steam chest so as to form a front wall of said combustion chamber when said steam table is assembled, said last-named shield means being so constructed and arranged as to permit access to said fire unit when said steam table is assembled.

6. A portable knockdown steam table comprising a rectangular steam chest of sheet metal; a pair of detachable ground-engaging assemblies for supporting said steam chest, each of said assemblies comprising a pair of legs and a metal sheet interconnecting said legs, said metal sheet forming an end wall of a combustion chamber when said steam table is assembled; a rectangular member for supporting a plurality of fire units in spaced relation, said member being adapted to form the bottom of said combustion chamber when said steam table is assembled; a wall member on said supporting member for closing the space between said fire units; releasable interconnecting means on said ground-engaging assemblies and on said supporting members; and shield means hingedly connected to opposite bottom edges of said steam chest and adapted to lie flat against said steam chest when said steam table is knocked down and to depend downwardly from said steam chest so as to form front and rear walls of said combustion chamber when said steam table is assembled, the shield means forming said front wall being so constructed and arranged as to permit access to said fire unit when said steam table is assembled.

LAUREN N. ELKIN.

REFERENCES CITED

The following references are of record in the file of this patent:

UNITED STATES PATENTS

| Number | Name | Date |
| --- | --- | --- |
| 213,029 | Ashcroft | Mar. 11, 1879 |
| 434,548 | Malen | Aug. 19, 1890 |
| 828,801 | Baxter | Aug. 14, 1906 |
| 878,862 | Boughton | Feb. 11, 1908 |
| 980,842 | Schnyder | Jan. 3, 1911 |
| 1,323,028 | Demuth | Nov. 25, 1919 |
| 1,327,115 | Robinson | Jan. 6, 1920 |
| 1,430,006 | Demuth | Sept. 26, 1922 |
| 1,505,299 | Stirn | Aug. 19, 1924 |
| 1,962,454 | Meanor | June 12, 1934 |
| 2,024,259 | Troeber et al. | Dec. 17, 1935 |
| 2,055,564 | Tinnerman | Sept. 29, 1936 |
| 2,331,913 | Howard | Oct. 19, 1943 |